(12) United States Patent
Bucklew et al.

(10) Patent No.: US 11,502,758 B2
(45) Date of Patent: Nov. 15, 2022

(54) COMMUNICATIONS SYSTEM USING PULSE DIVIDER AND ASSOCIATED METHODS

(71) Applicant: EAGLE TECHNOLOGY, LLC, Melbourne, FL (US)

(72) Inventors: Victor G. Bucklew, Richmond, VA (US); Fraser R. Dalgleish, Vero Beach, FL (US); Cypryan T. Klish, Melbourne, FL (US); James A. Nagel, Fort Wayne, IN (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/179,600

(22) Filed: Feb. 19, 2021

(65) Prior Publication Data
US 2022/0271846 A1 Aug. 25, 2022

(51) Int. Cl.
| | | |
|---|---|---|
| *H04B 10/69* | (2013.01) | |
| *H04B 10/61* | (2013.01) | |
| *H04B 10/508* | (2013.01) | |
| *H04B 10/2569* | (2013.01) | |
| *H04B 10/079* | (2013.01) | |

(52) U.S. Cl.
CPC ....... *H04B 10/697* (2013.01); *H04B 10/0795* (2013.01); *H04B 10/2569* (2013.01); *H04B 10/508* (2013.01); *H04B 10/6166* (2013.01)

(58) Field of Classification Search
CPC .............. H04B 10/697; H04B 10/0795; H04B 10/2569; H04B 10/508; H04B 10/6166
USPC .................................................. 398/202–214
See application file for complete search history.

(56) References Cited

U.S. PATENT DOCUMENTS

| | | | |
|---|---|---|---|
| 7,174,105 B2 | 2/2007 | Shahar | |
| 8,456,736 B2 | 6/2013 | Wise et al. | |
| 10,109,976 B2 | 10/2018 | Wise et al. | |
| 10,374,376 B2 | 8/2019 | Liu et al. | |
| 10,951,324 B2* | 3/2021 | Lucamarini | ............ H04B 10/54 |
| 2001/0017724 A1* | 8/2001 | Miyamoto | ......... H04B 10/5051 |
| | | | 398/128 |
| 2009/0106533 A1* | 4/2009 | Arakawa | ............... G06F 9/3885 |
| | | | 712/205 |

(Continued)

FOREIGN PATENT DOCUMENTS

| | | |
|---|---|---|
| CN | 111130780 | 5/2020 |
| EP | 1935119 | 11/2011 |

(Continued)

OTHER PUBLICATIONS

Huang et al; Temporal and spectral coding over amplified spontaneous emission for secure optical coherent communications; Jan. 2020; optical society of America; pp. 1-4. (Year: 2020).*

(Continued)

*Primary Examiner* — Amritbir K Sandhu
(74) *Attorney, Agent, or Firm* — Allen, Dyer, Doppelt + Gilchrist, P.A.

(57) ABSTRACT

A communications system may include a transmitter node, a receiver node, and an optical communications channel coupling the transmitter node and receiver node. The transmitter node may include a pulse transmitter and a pulse divider downstream therefrom. The receiver node may include a pulse recombiner and a pulse receiver downstream therefrom.

13 Claims, 10 Drawing Sheets

(56) References Cited

U.S. PATENT DOCUMENTS

| | | | | |
|---|---|---|---|---|
| 2009/0106553 | A1* | 4/2009 | Wang | A63B 22/0002 713/168 |
| 2011/0097085 | A1* | 4/2011 | Oda | H04B 10/516 398/65 |
| 2011/0141552 | A1* | 6/2011 | Ghera | H04B 10/2942 359/334 |
| 2014/0105598 | A1* | 4/2014 | Lucamarini | H04B 10/07955 398/38 |
| 2016/0047643 | A1* | 2/2016 | Yuan | H01S 5/4006 398/25 |
| 2020/0328811 | A1* | 10/2020 | Mertz | H04J 14/02 |
| 2021/0099236 | A1 | 4/2021 | Bucklew et al. | |

FOREIGN PATENT DOCUMENTS

| | | |
|---|---|---|
| GB | 2581528 | 8/2020 |
| WO | 2008127451 | 10/2008 |

OTHER PUBLICATIONS

Zhou et al; Divided-pulse amplification of ultrashort pulses; Mar. 2007; Optical society of America; pp. 1-3. (Year: 2007).*

Huang et al; Temporal and spectral coding over amplified spontaneous emission for secure optical coherent communications; Feb. 2020; Optical society of America; pp. 1-4. (Year: 2020).*

Zhou et al; Divided-pulse amplification of ultrashort pulses; Apr. 2007, Optical society of America; pp. 1-3. (Year: 2007).*

Ma et al; Steganographic Communication via Spread Optical Noise: A Link-Level Eavesdropping Resilient System; Dec. 2018; Journal of Lightwave technology, vol. 36, No. 23; pp. 1-14. (Year: 2018).*

Zhou et al; Divided-pulse amplification of ultrashort pulses; Apr. 2007; Optics Letters vol. 32, No. 7; pp. 1-3. (Year: 2007).*

Korzh et al., "Provably Secure and Practical Quantum Key Distribution over 307 km of Optical Fibre." Nature Photonics 9, 163-168 (2015), DOI: 10.1038/nphoton.2014.327, 13 pages.

Diamanti et al., "Practical Challenges in Quantum Key Distribution," npl Quantum Information, arXiv: Quantum Physics (2016): pp. 1-12.

Bucklew et al., U.S. Appl. No. 16/687,767, filed Nov. 19, 2019, (cited application is stored in the the USPTO's IFW system).

Bucklew et al., U.S. Appl. No. 16/668,002, filed Oct. 30, 2019, (cited application is stored in the the USPTO's IFW system).

Bucklew et al., U.S. Appl. No. 16/668,025, filed Oct. 30, 2019, (cited application is stored in the the USPTO's IFW system).

Bucklew et al., U.S. Appl. No. 17/179,562, filed Feb. 19, 2021 (cited application is stored in the the USPTO's IFW system).

Zhou et al., "Divided-Pulse Amplification of Ultrashort Pulses." Optics letters, 32(7), (2007), pp. 871-873.

Zhang et al., "Divided Pulse Soliton Self-Frequency Shift: A Multi-Color, Dual-Polarization, Power-Scalable, Broadly Tunable Optical Source." Optics letters, 42(3), (2017), pp. 502-505.

Lamb et al., Divided-Pulse Lasers. Optics letters, 39(9), (2014), pp. 2775-2777.

Wang et al., "Laser beam propagation effects on secure key rates for satellite CV-QKD with discrete modulation", IEEE Photonics Conference, Sep. 2019, pp. 1-2.

Schildkraut et al., "Investigating the role of spatiotemporal optical beam profiles in mixed layer oceanic communication channels", Global Oceans, IEEE, Oct. 2020, pp. 1-5.

Liao et al., "Satellite-to-ground quantum key distribution", Cornell University, Jul. 2017, pp. 1-18.

Anwar et al., "Entangled photon-pair sources based on three-wave mixing in bulk crystals", Cornell University, Jul. 2020, pp. 1-29.

* cited by examiner

|  | STATE-OF-ART (d=2) | DIVIDED PULSE QKD (d=2) W/ 4 STAGES *ASSUMING EVE DOES NOT HAVE A MATCHED RX |
|---|---|---|
| QBER W/O EVE QBER - QUANTUM BIT ERROR RATE | 0 | 0 |
| QBER W/ EVE | .25 | 1 |
| RELATIVE THROUGHPUT | 1 | .4 |

COMMUNICATIONS SYSTEM USING PULSE DIVIDER AND ASSOCIATED METHODS

FIELD OF THE INVENTION

The present invention relates to the field of communications and, more particularly, to optical communications systems and related methods.

BACKGROUND OF THE INVENTION

In a quantum communications system, sometimes referred to as a quantum information system, information is exchanged between a transmitter node and a receiver node using encoded single photons. Each photon carries information that is encoded on a property of the photons, such as its polarization, phase, or energy in time. These quantum communications systems generally require sending information from one node to another node, such as a transmitter node, usually referred to as "Alice," and a receiver node, usually referred to as "Bob." The term quantum communications system encompasses multiple applications. For example a quantum key distribution (QKD) system allows the sharing of cryptographic keys between the transmitter node and receiver node, thus allowing a more secure communication between the two parties. A QKD system provides a test whether any part of the key would be known to an unauthorized third party eavesdropper, usually referred to as "Eve."

Individual bits of the bit stream are transmitted using single photons. By using complementary properties to which Heisenberg's uncertainty principle applies, information may be encoded into a photon to prevent the unauthorized third party, e.g., "Eve," from monitoring the photon since it would disturb its state. When a secret key is established between the two parties by this QKD system, the two parties may then encrypt data transmitted over any conventional communications channel.

In the QKD system, the two parties as Alice and Bob at the respective transmitter node and receiver node may use two or more non-orthogonal bases to encode bit values. The laws of quantum mechanics apply to the photons and any measurement of the photons by an eavesdropper, e.g., Eve, without prior knowledge of the encoding basis of each photon, causes an unavoidable change to the state of some of the photons. These changes to the states of the photons may cause errors in the bit values sent between the transmitter node and receiver node, and by comparing a part of the common bit steam, the two parties may determine if the eavesdropper, e.g., Eve, has gained information. Photon polarization is often used to provide the complementary properties for encoding, and is used in the common QKD protocol, BB84, and may be applied to conjugate states, such as the polarization state of the quantum state. Other QKD protocols, such as E91, may be based on entanglement of photon pairs and used in a QKD system.

Other applications of a quantum communications system include quantum random number generator (QRNG) systems that use the inherent indeterminacy of quantum entangled photons to produce random binary digits, and quantum secure direct communication (QSDC) systems that transfer direct information between Alice and Bob without a distribution key. In QSDC systems, the transmitter node as Alice generates quantum photons that carry secure quantum information representative of the data to be communicated. The quantum photons carrying the data are decoded upon receipt at the receiver node as Bob.

QSDC systems are based on quantum mechanics for direct transmission of information without employing a distributed cryptographic key to encrypt the data. QSDC systems may be more efficient than some keyed communication systems because the cryptographic key development and key storage requirements are eliminated. Transmitted photons carrying data within the QSDC system may be more readily maintained in confidence without being erased, manipulated or monitored by unintended third parties, such as Eve. These QSDC systems may provide tamper evident communication links that are compatible with the direct transmission of data at the single photon level. As a result, QSDC systems may become more important as quantum computers increase in sophistication and allow conventional cryptographic keys to be more easily broken, while quantum interconnects are developed that network computers together. Improvements in QSDC systems may also provide quantum signatures and improve the efficiency and impart greater security in a quantum communications channel.

Current cryptographic standards may suffice for ensuring security of most types of data at the current time. It is anticipated that these standards will eventually become obsolete due to advances in quantum computing. Current techniques of QKD that use photons in prepare and measure schemes have high brightness, but have quantum bit error rates (QBER) limits on the order of about 15%. Thus, the errors in the bit rate should not exceed 15% before aborting the QKD protocol. As a result, QKD protocols are difficult to implement in noisy or turbulent communication links, and quantum communication systems that produce a large QBER may require communications equipment to be kept under strict environmental conditions, which limit the applicability of QKD. Other protocols, such as round-robin DPS protocol, have a higher QBER tolerance of about 50%, but the best key rate is about 10 Kbit/s over 50 kilometers of fiber. Other protocols have similar limitations on performance, which degrades with channel conditions. It is desirable to implement low latency, but high security communications not only in a quantum communication system such as a QSDC system, but also into a quantum communication system using QKD protocols. It would also be desirable to apply such improvements into non-quantum optical communications systems.

SUMMARY OF THE INVENTION

In general, a communications system may include a transmitter node, a receiver node, and an optical communications channel coupling the transmitter node and receiver node. The transmitter node may comprise a pulse transmitter and a pulse divider downstream therefrom. The receiver node may comprise a pulse recombines and a pulse receiver downstream therefrom. The optical communications channel may comprise a fiber optic communications channel, a free-space optical communications channel, or an underwater communications channel. The pulse transmitter may be configured to generate an optical signal carrying communications data and amplified spontaneous emission (ASE) noise. The pulse receiver may comprise a photoelectric detector and a signal processor coupled to the photoelectric detector and configured to separate the ASE noise from the communications data.

In some embodiments, the pulse divider may comprise a plurality of birefringent elements that divide pulses received from the pulse transmitter into a first group of pulses having a first polarization and a second group of pulses having a second orthogonal polarization. The first and second groups of pulses may be interleaved with each other.

Another aspect is directed to a method of operating a communications system that includes a transmitter node, a receiver node, and a communications channel coupling the transmitter node and receiver node. The method may include operating the transmitter node to generate optical pulses at a pulse transmitter and dividing the optical pulses at a pulse divider. The method may also include operating the receiver node to recombine the optical pulses at a pulse recombiner and receiving the recombined pulses at a pulse receiver.

BRIEF DESCRIPTION OF THE DRAWINGS

Other objects, features and advantages of the present invention will become apparent from the detailed description of the invention which follows, when considered in light of the accompanying drawings in which:

FIG. 5 is a chart showing the sensitivity to tampering using the quantum communications system of FIG. 1 when employing a QKD protocol.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
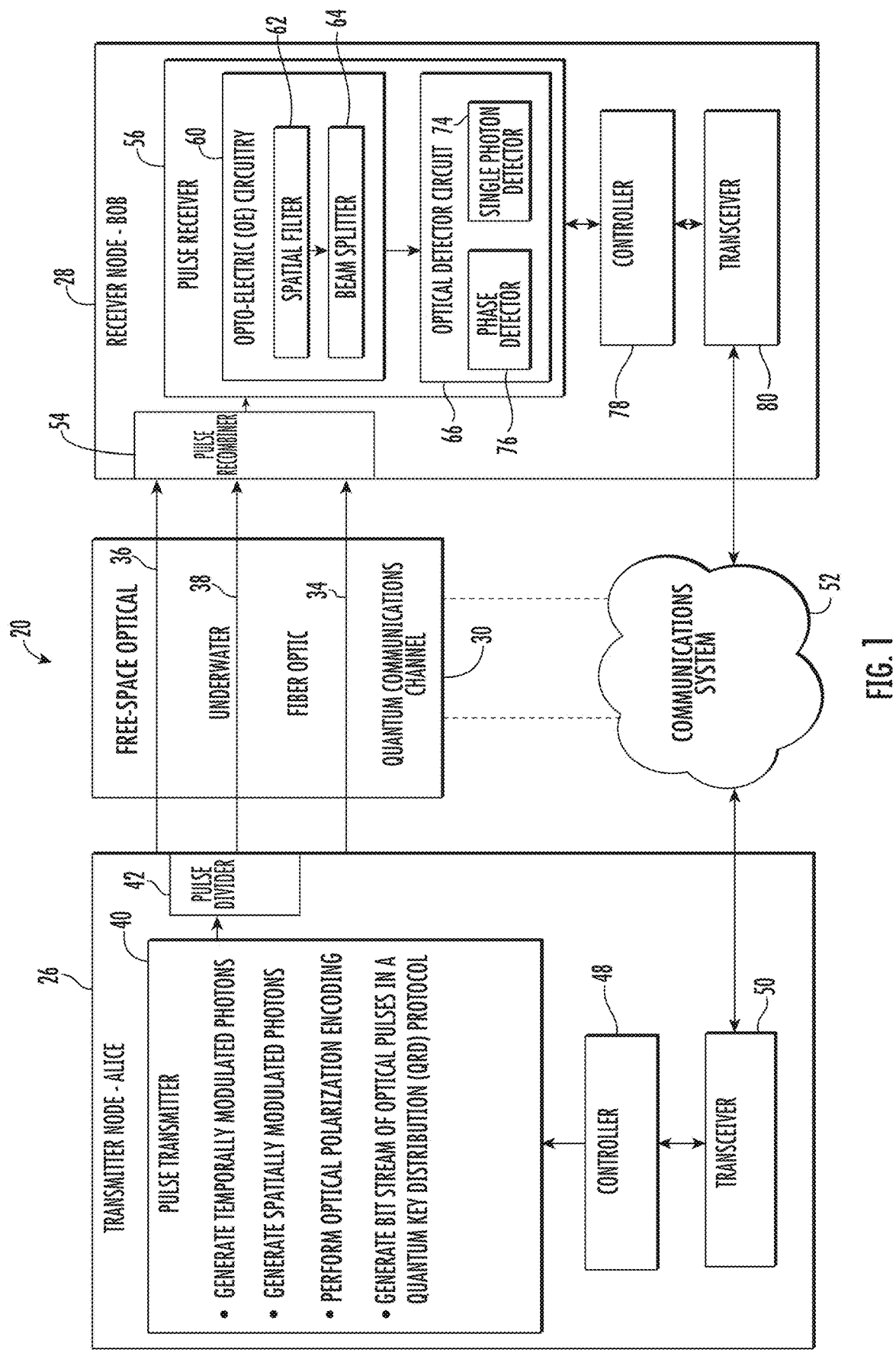
FIG. 1 is a block diagram of the quantum communications system having the pulse divider and pulse recombiner in accordance with a non-limiting example.

Referring initially to FIG. 1, a quantum communications system is illustrated generally at 20 and may be operative as a quantum secure direct communications (QSDC) system, which permits direct communication, such as without use of a cryptographic key. The quantum communications system 20 includes a transmitter node 26 referred to as Alice, a receiver node 28 referred to as Bob, and a quantum communications channel 30 coupling the transmitter node and receiver node. The quantum communications system 20 may use the pulse division apparatus to place a quantum state into a superposition of time bins. Neighboring quantum states thus experience interference with each other, which scrambles the original data stream. Coupled with the he no-cloning theorem of quantum mechanics this acts as a physical layer of security that can be used to more securely transmit quantum data streams within the quantum communications channel 30 without the additional use of a cryptographic key in some embodiments.

Quantum states that have had their probability distribution functions broadened through the pulse divider apparatus so that these probability distribution functions interfere with neighboring states in the quantum data stream in public sections of the quantum communications channel 30 scramble the original data stream. The pulse recombiner at the receiver node 28 where Bob is located reconstructs the original data stream. The input state at the transmitter node 26 is divided into many temporal copies that are separated in time from each other which broadly redistributes its probability distribution function and spoofs attempts to gain information about it within the public sections of the quantum communications channel 30 where an eavesdropper, referred to as Eve, would be located.

Photon self-interference in the spatial domain and use of a spatial filter in the spatial domain may reveal data tampering. Because the spatial probability distribution function cannot be perfectly categorized, cloned and reintroduced to the public section of the quantum communications channel 30, any attempt to monitor, misrepresent or omit temporal data may introduce spatial probability distribution changes that will not cleanly exit a spatial filter at the receiver node 28, thus revealing tampering by an interferer within the public link of the quantum communications channel.

In an example, the quantum communications channel 30 may include a fiber optic communications channel 34, which may be a single mode optical fiber or a multi-mode fiber. The single mode optical fiber may be used for transmitting temporally modulated photons, and the multi-mode optical fiber may be used for transmitting both temporally and spatially modulated photons. The quantum communications channel 30 may include a free-space optical (FSO) communications channel 36 that includes satellite or line-of-sight communications, or an underwater communications channel or bulk medium 38.

As illustrated, the transmitter node 26 includes a pulse transmitter 40 as a laser pulse source and a pulse divider 42 downstream therefrom, such as positioned directly at the output or further downstream. The transmitter node 26 also includes a controller 48 that operates the pulse transmitter 40 and a transceiver 50 that connects to a communication system 52 as will be explained in further detail below and which may be part of the quantum communications channel 30. The receiver node 28 includes a pulse recombiner 54 and a pulse receiver 56 downstream. The pulse receiver 56 may include opto-electric (OE) circuitry 60 having a spatial filter 62 and a beam splitter 64 that splits signals into a phase basis or time basis at an optical detector circuit 66, which includes a phase detector 76 and single photon detector 74. The receiver node 24 includes a controller 78 and transceiver 80 connected thereto. The transceiver 80 is coupled to the communications system 52.

The pulse transmitter 40 may be configured to generate temporally modulated photons. The pulse receiver 56 includes opto-electric (OE) circuitry 60 that detects phase bin states using the optical detector circuit 66. The pulse receiver 56 may include at least one single photon detector 74. The pulse transmitter 40 may also be configured to generate spatially modulated photons and perform optical polarization encoding. The pulse transmitter 40 may be configured to generate a bit stream of quantum pulses in a quantum key distribution (QKD) protocol as explained in further detail below.

In an example, the quantum pulses may be time bin photons and the pulse divider 42 at the transmitter node 25 may divide the pulses across other time bins. The pulse recombiner 54 at the receiver node 28 may recombine the pulses. In an example, the pulse divider 42 and pulse recombiner 54 may operate to provide a divided pulse quantum key distribution that may be applied on top of existing QKD protocols and implemented downstream of the pulse transmitter and upstream of the pulse receiver 56 to improve the performance of existing QKD protocols.

In an example, the transmitter node 26 may be configured to generate temporally modulated photons that are communicated over the fiber optic communications channel 34, which may be single mode optical fiber. The transmitter node 26 may also be configured to generate spatially modulated photons that are transmitted over a multi-mode optical fiber. In both cases, the temporally or spatially modulated photons may use optical polarization encoding, and each photon may have a transmitted quantum basis.

The transmitter node 26 communicates with the receiver node 28 over the quantum communications channel 30. Both transmitter and receiver nodes 26,28 may communicate via the communications system 52, which may include a classical communications channel and may be fiber optic, free-space, wired, or another conventional communications channel. This communications system 52 may be used if additional functions are desired, such as cryptographic key generation and quantum key distribution (QKD), or communication with networked devices using conventional transceivers. The quantum communications system 20 may use cryptographic key sifting or operate as a QSDC system. The quantum communications channel 30 may be part of the communication system 52 as indicated by the dashed lines connecting the two, indicating that both the quantum communications and non-quantum communications may be transmitted over any communications channel as part of the communications system 52.

In an example, the optical pulse output from the pulse transmitter 40 at the transmitter node 26 may be an output bit stream of photons that are encoded bit values. The photon polarization may provide a complementary property used for encoding purposes, such as in the QKD protocol, BB84. Other protocols, such as the E91 protocol, may be used that includes the entanglement of photon pairs. Each bit of information such as a "0" or "1" may be encoded onto an individual photon by selecting from a pair of orthogonal polarization states. In the BB84 QKD protocol, two pairs of orthogonal states are used, and each pair of orthogonal states is referred to as a "basis." The basis may provide polarization state pairs in a rectilinear basis having vertical and horizontal polarization, such as 0° and 90°, and a diagonal basis having opposite diagonal direction polarization, such as 45° and 135°.

It is also possible to use a circular basis of left-handedness and right-side handedness depending on what other bases are used that are conjugate to each other. The quantum communications system 20 may use an unencrypted non-quantum communications channel, such as the communications system 52, for the key exchange or key sifting process, as key exchange is commonly called. It is possible to use a continuous-variable QKD (CV-QKD) protocol or a discrete-variable (DV-QKD) protocol. Single protons may be generated for the DV-QKD protocol, usually as optical pulses, and requires single photon detectors 74 at the receiver node 28, for example, as an array of single photon optical detectors. In contrast to the DV-QKD protocol, the CV-QKD protocol may use conjugate-continuous degrees of freedom (field quadratures) of a light pulse prepared in a Gaussian (coherent or squeezed) state to transmit signals that constitute a shared randomness. At the receiver node 28, the field quadratures of each light pulse may be measured using as an example, shot-noise limited, balanced homodyne or heterodyne detectors, such as phase detectors 76, which have an advantage of not requiring single photon detection and operating at high GHz speed detection rates. In the CV-QKD protocol, often a local oscillator (OL) signal may be generated at the transmitter node 26 and the CV-QKD protocol may involve polarization encoding and multiplexing techniques.

As noted before, the transceiver 50 at the transmitter node and the transceiver 80 at the receiver node 28 may communicate with the communications system 52, which may be a conventional or non-quantum communications system. For example, Bob as the party at the receiver node 28 may communicate with Alice as the party at the transmitter node 26 over the conventional communications system 52, and transmit data regarding the basis in which each photon was received at the receiver node 28. The transmitter node 26, e.g., Alice, may transmit data about the basis in which each photon was transmitted to the receiver node 28, e.g., Bob, using the communications system 52. Any bits having a different basis may be discarded, leaving the remaining bits as the basis for a shared cryptographic key in the key verification or key shifting phase. The subset of shared bits used by both parties, e.g., Alice and Bob as to the respective transmitter node 26 and receiver node 28, may be used to check against eavesdropping by the unauthorized party, e.g., Eve, which would have introduced errors into the communications stream of bits.

The transmitter node 26 with the pulse transmitter 40 may include other components not illustrated in detail, such as a spatial light modulator (SLM) that imposes a spatially varying modulation by modulating intensity and phase, a waveguide array and circuitry that generates phase bin states, and an attenuation filter.

As noted before, the transmitter node 26 includes the pulse transmitter 40 for generating a bit stream of "quantum" optical pulses. Although a pulse transmitter 40 as a laser is described, it should be understood that other sources of the pulses may be used that generate the bit stream of pulses.

The pulse output from the transmitter node 26 is an output bit stream of photons that are encoded bit values. The photons may be temporally or spatially modulated photons and have a transmitted quantum basis that includes time and phase parameters, including optical polarization encoding. The photon polarization provides the complementary property used for encoding purposes and in the quantum communications system 20 as described, with optical pulses arranged in time bins in this example, photon polarization may be applied to conjugate states, such as phase encoding. The quantum communications system 20 may use entanglement of photon pairs. Each bit of information such as a "0"

or "1" may be encoded onto an individual photon by selecting from a pair of orthogonal polarization states. In an example, two pairs of orthogonal states may be used, and each pair of orthogonal states may be referred to as a "basis." The bases may provide polarization state pairs in a rectilinear basis having vertical and horizontal polarization, such as 0° and 90°, and a diagonal basis having opposite diagonal direction polarization, such as 45° and 135°. It is also possible to use a circular basis of left-handedness and right-handedness depending on what other bases are used that are conjugate to each other.

The transmitter node 26 includes its controller 48 operatively connected to the laser pulse transmitter 40 and other components at the transmitter node 26 for controlling their operation, such that the pulse transmitter is controlled for transmitting a photon in a polarization state defined by the bit and basis and in time bins, and record the time the photon was transmitted. This process is repeated for the string of bits as a stream of photons. The transmitter node 26 may include its transceiver 50 connected to the controller 48 and operative to communicate with conventional networked components via the communications system 52. Additional functions for Quantum Key Distribution (QKD) with the receiver node 28 may be provided via the communications system 52.

The transmitter node 26 may transmit the stream of pulses via the pulse divider 42 over the quantum communications channel 30, such as the fiber optic communications channel 34, and as either separate or a part of the communications system 52, and either as temporally modulated photons or spatially modulated photons in an example. It is possible to use the same fiber optic communications channel 34 for both quantum communications and conventional communications.

The receiver node 28 includes the pulse recombiner 54 that recombines the pulses and the pulse receiver 56 includes in this example the opto-electronic (OE) circuitry 60 that receives the bit stream of pulses from the transmitter node 26 over the quantum communications channel 30. This OE circuitry 60 may include a spatial filter 62 and a beam splitter 64 for splitting the optical signal into an optical phase or time streams for measurement in the phase basis or time basis as explained below. The spatial filter 62 may be used to "clean up" the stream of optical pulses and produce a smooth intensity profile as a cleaner Gaussian signal that has unwanted multiple-order energy peaks removed such that the central maximum of a diffraction energy pattern will be passed through the OE circuitry 60. The spatial filter 62 may include a microscopic objective lens, a pinhole aperture and a positioning mechanism having precision X-Y movement at the center of the pinhole that operates as the focal point of the objective lens in a non-limiting example. The spatial filter 62 may also be advantageous because it operates as a filter for the spatial probability distribution function that may not be characterized, cloned and reintroduced to the public portion of the quantum communications channel 30. Thus, any spatial probability distribution disturbances that are introduced may not cleanly exit the spatial filter 62, and thus, Bob at the receiver node 28 may use this information as a metric to reveal tampering.

The optical detector circuit 66 receives the bit stream of optical pulses from the OE circuitry 60 and detects the optical pulses and generates signals that may be processed at the controller 78, which processes and demodulates the signals representative of the optical pulses depending on the communications protocol. At the receiver node 28, the optical detector circuit 66 may be formed as a single photon detector 74 for measuring photons in the time basis and in respective time bins, where the optical pulses are transmitted in respective time bins for data encoding. In an example, the optical detector circuit 66 may include an array of single photon detectors 74. The optical detector circuit 66 may also include a phase detector apparatus 76 for measuring the photons in the phase basis.

The controller 78 at the receiver node 28 may be connected to the conventional transceiver 80, also located at the receiver node 28. This transceiver 80 may communicate via the conventional or non-quantum communications system 52 with the other networked components or to the transceiver 50 located at the transmitter node 26. The transmitter node 26 may include other components not illustrated in detail, such as a spatial light modulator (SLM) that imposes a spatially varying modulation by modulating intensity and phase, a waveguide array that increases bit generation and phase bin states, and an attenuation filter. These components may be used to transmit temporally modulated photons or spatially modulated photons and perform optical polarization encoding.

As noted before, the OE circuitry 60 at the receiver node 28 may include a spatial filter 62 and a beam splitter 64 to split any incoming optical pulse streams for time processing and phase processing as explained in greater detail below. The optical detector circuit 66 may include the phase detector apparatus 76 and single photon detector 74 for phase basis and time basis measurements, respectively.

Generally, an eigenstate $|\Psi\rangle$ as a photon of a particular basis is prepared and transmitted from the transmitter node 26 as Alice over the quantum communications channel 30 to the receiver node 28 as Bob. In a conventional QKD system, if the eigenstate $|\Psi\rangle$ was prepared in the same photon basis that Eve or Bob as the receiver node 28 chooses to measure the quantum state in, both will measure the same state that Alice at the transmitter node 26 initially prepared. If Eve or Bob at the receiver node 28 choose a different basis than the one Alice at the receiver node 26 initially prepared the quantum state in, both would collapse the eigenstate $|\Psi\rangle$ into one of the eigenstates of the basis they were measuring in, and would have a 50% chance in a d=2 data structure, for example, corresponding to a random guess, of correctly identifying the associated bit value of the state that Alice sent.

This use of mutually unbiased bases, and the impact of preparing and measuring in inconsistent bases, is used to establish a more secure communications link between Alice as the transmitter node 26 and Bob as the receiver node 28 over the quantum communications channel 30. As Eve is forced to annihilate the state Alice 26 has prepared as a single photon in order to gain any information about it, and as Eve must randomly choose a basis to measure the state in, on average Eve will choose the wrong basis 50% of the time, both resulting in measurements which do not provide Eve information about the original state, and revealing Eve's presence to Bob as the receiver node 28 downstream through a quantum bit error rate (QBER) that is higher than a certain threshold value.

It is generally assumed that the eigenstate $|\Psi\rangle$ prepared in a particular basis, does not change as it propagates. Thus, If Eve and Bob as the receiver node 28 choose the same basis to measure the state that Alice as the transmitter node 26 initially used to prepare the state in, Eve and Bob will both measure it accurately. For a 4-state transmission, however, Eve has on average a 75% chance of correctly retrieving the bit value that Alice as the transmitter node 26 sends, as she has a 50% chance of correctly choosing the right basis and 100% accuracy of retrieving the associated bit value in the correct basis, and a 50% chance of choosing the wrong basis, and a 50% accuracy of retrieving the associated bit value when measuring in the wrong basis. The amount of error that Bob 28 can tolerate before knowing that the quantum communications channel 30 is insecure and that Eve is present, is in part dependent on this probability, which essentially reflects the amount of information that Eve has access to.

Increasing the maximum threshold of the quantum bit error rate (QBER) that Bob 28 can tolerate before concluding that the quantum communications channel 30 is insecure may increase secure link lengths, increase secure bit rates, and enable more efficient and cost effective implementations of the quantum communications system 20 in existing communication links and better enable secure communications for QKD systems, and transmission of quantum information in general, for instance for distributed quantum computing or sensing applications.

The quantum communications system 20 increases the maximum QBER threshold where an initial state $|\Psi\rangle$ has its temporal probability distribution is broadened so that it interferes with other neighboring bits in the bit stream, and scrambles the state and bit stream in the public link of the quantum communications channel 30 that Eve has access to. This results in any measurements made at a location other than where Alice as the transmitting node 26 and Bob as the receiving node 28 are located will reduce the information available to Eve, even if Eve chooses to measure $|\Psi\rangle$ in the same basis that the state was initially prepared in. The quantum communications system 20 may reduce Eve's information about the eigenstate $|\Psi\rangle$ in the public segment of the quantum communications channel 30 even for measurements she conducts in the correct basis. The QBER threshold required for unconditional security may be increased even when Eve chooses the right basis. The probability that Eve will measure the state Alice at the transmitter node 26 initially sent is reduced. As a result, using the quantum communications system 20 of FIG. 1 as a QSDC system, Alice 26 and Bob 28 may tolerate higher system losses, increase communication link distances, relax optical detector requirements, and more easily adapt the system into existing telecom networks.

Figure 2:
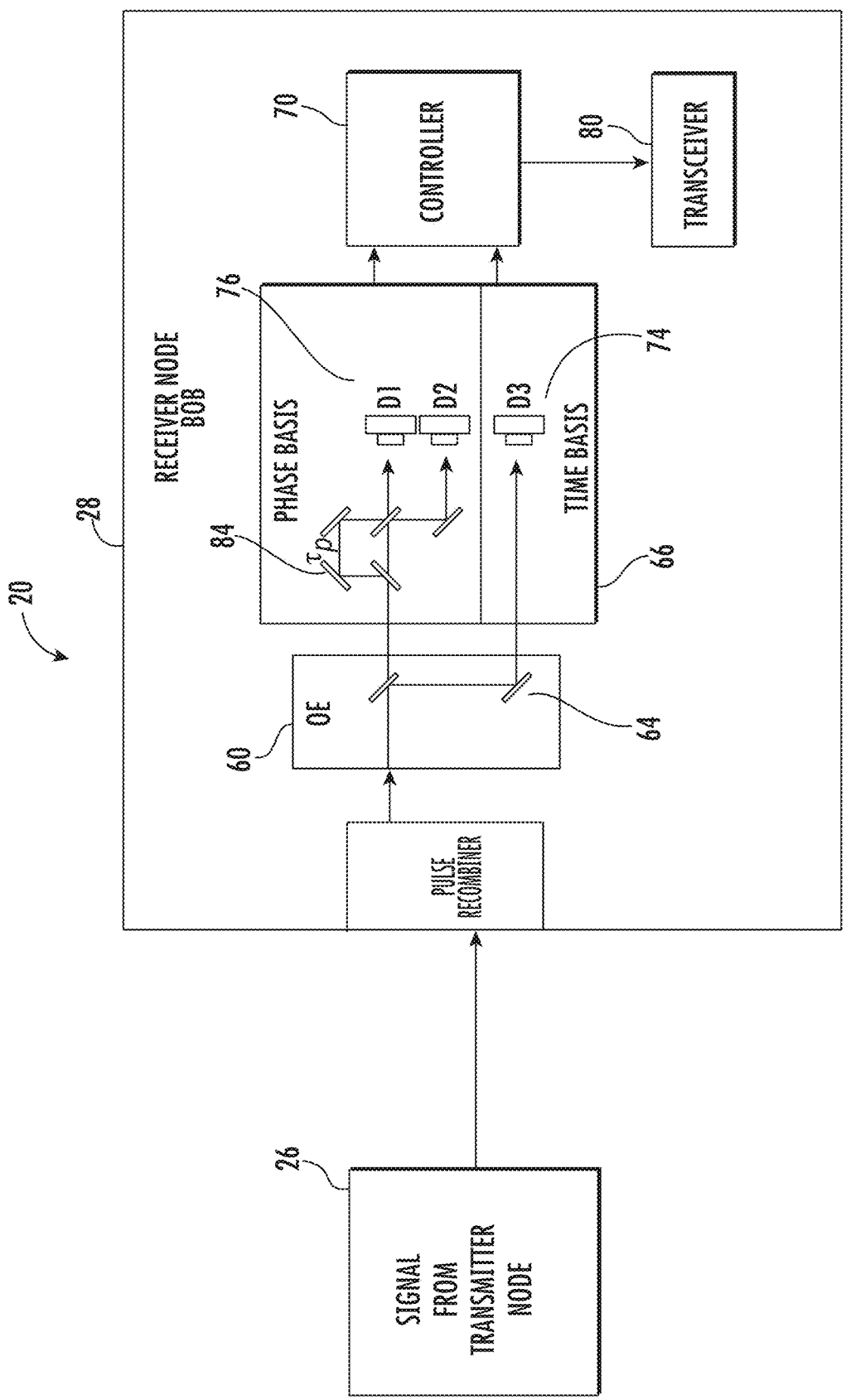
FIG. 2 is a schematic block diagram of the receiver node of FIG. 1 showing phase and time basis.

Further details of pulse detection occurring at the receiver node 28 are explained relative to FIG. 2, where a schematic block diagram is illustrated, and showing the optical detector circuit 66 having a phase basis section as part of the phase detector 76, which includes detectors D1 and D2 for phase basis measurements, and in this example, a single photon detector 74 for time basis measurements and including detector D3. The quantum communications system 20 results in the correct determination of the state for the quantum basis it is intended to be measured in, and inconclusive results of the state when measured in an unintended basis. As shown in FIG. 2, the phase detector 76 includes detectors D1 and D2, and the single photon detector 74 includes detector D3 and operating to measure the time bin photons. Time basis measurements may be performed with direct detection to resolve the arrival times of pulses associated with the various bit values that Alice 26 sends. It is also possible to use the time to frequency conversion as disclosed in commonly assigned U.S. patent application Ser. No. 16/583,346 filed Sep. 26, 2019, under the title, "Quantum Communication System Having Time to Frequency Conversion and Associated Methods," the disclosure which is hereby incorporated by reference in its entirety.

An incoming photon may be randomly directed by the beam splitter 64 to either a time basis measurement at the single photon detector 74 (D3) or a phase basis measurement at the phase detector apparatus 76 (D1 and D2). For time basis measurements, detector D3 as the single photon detector 74 detects the arrival time of the photon, which correlates with a particular time bin and associated bit value.

Phase basis measurements may be performed by passing the single photon state through a Mach-Zender interferometer 84, which has a delay set by the time bin width of a protocol for the quantum communications system 20 or a half width of the waveguide for the quantum communications system. Single photon interference occurs in a central time window, which the two outputs of the Mach-Zender interferometer 84 resolve constructively or destructively depending on the eigenstate of the phase basis that was sent. For example, if phase state 1 was sent with an associated bit value 0, the phase detector 76 would yield a detection event for P1 on Detector 1, and no detection event on P1 of Detector 2. There is a non-zero probability amplitude of a detection event in the other arrival time bins (P2 and P3) for both of detectors D1 and D2 in the phase basis. However, detection events in these time bins do not help discriminate between the two states, and so they are not used to make state determinations, e.g., only the central time bins "P1" are used.

Figure 3:
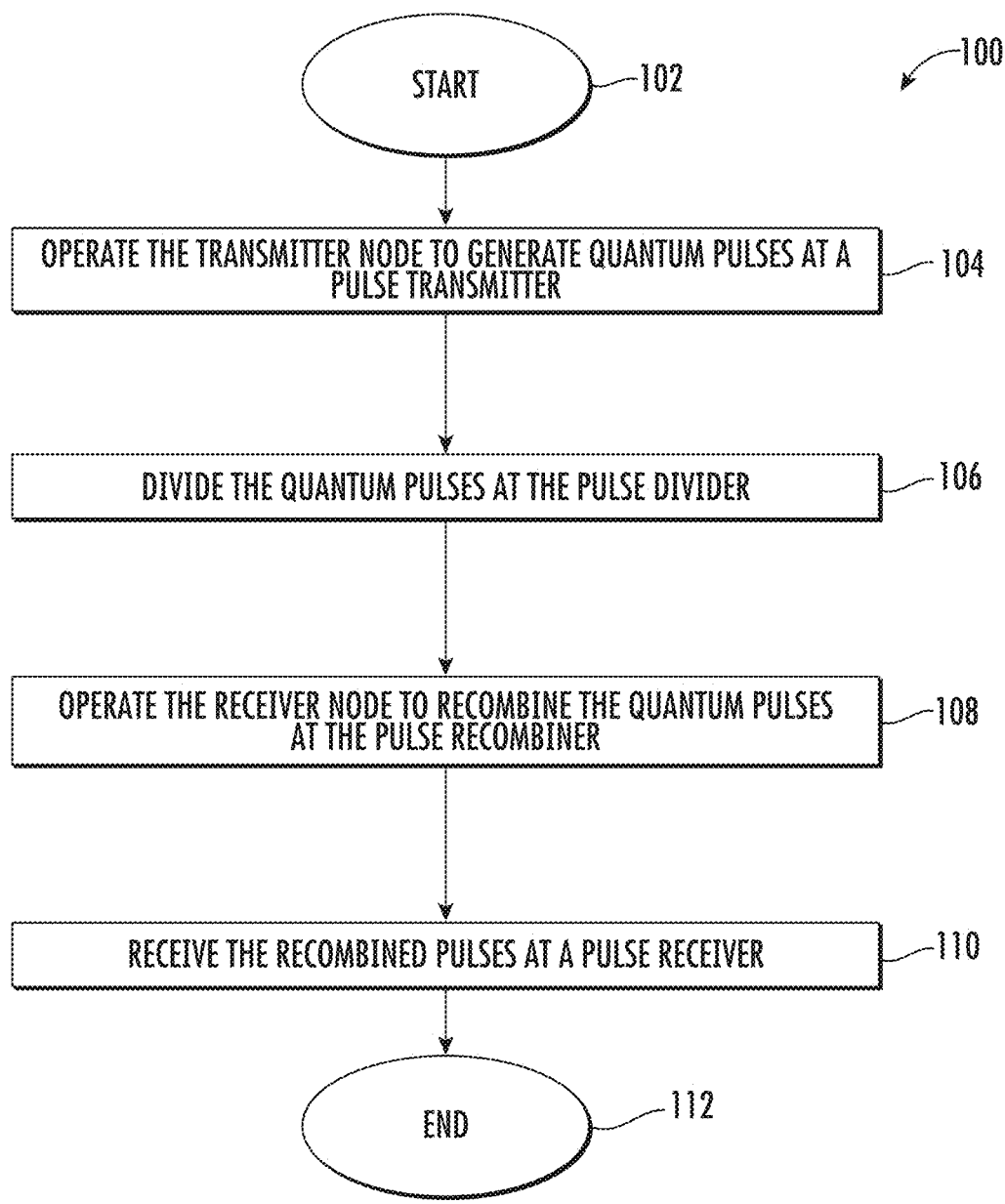
FIG. 3 is a flowchart showing a method of operating the quantum communications system of FIG. 1.

A flowchart illustrating a method of operating the quantum communication system is illustrated in FIG. 3 at 100. The process starts (Block 102), and the method includes operating the transmitter node 26 to generate quantum pulses at a pulse transmitter 40 (Block 104). The method further includes dividing the quantum pulses at the pulse divider 42 (Block 106), operating the receiver node 28 to recombine the quantum pulses at the pulse recombiner 54 (Block 108), and receiving the recombined pulses at the pulse receiver 56 (Block 110). The process ends (Block 112).

Figure 4:
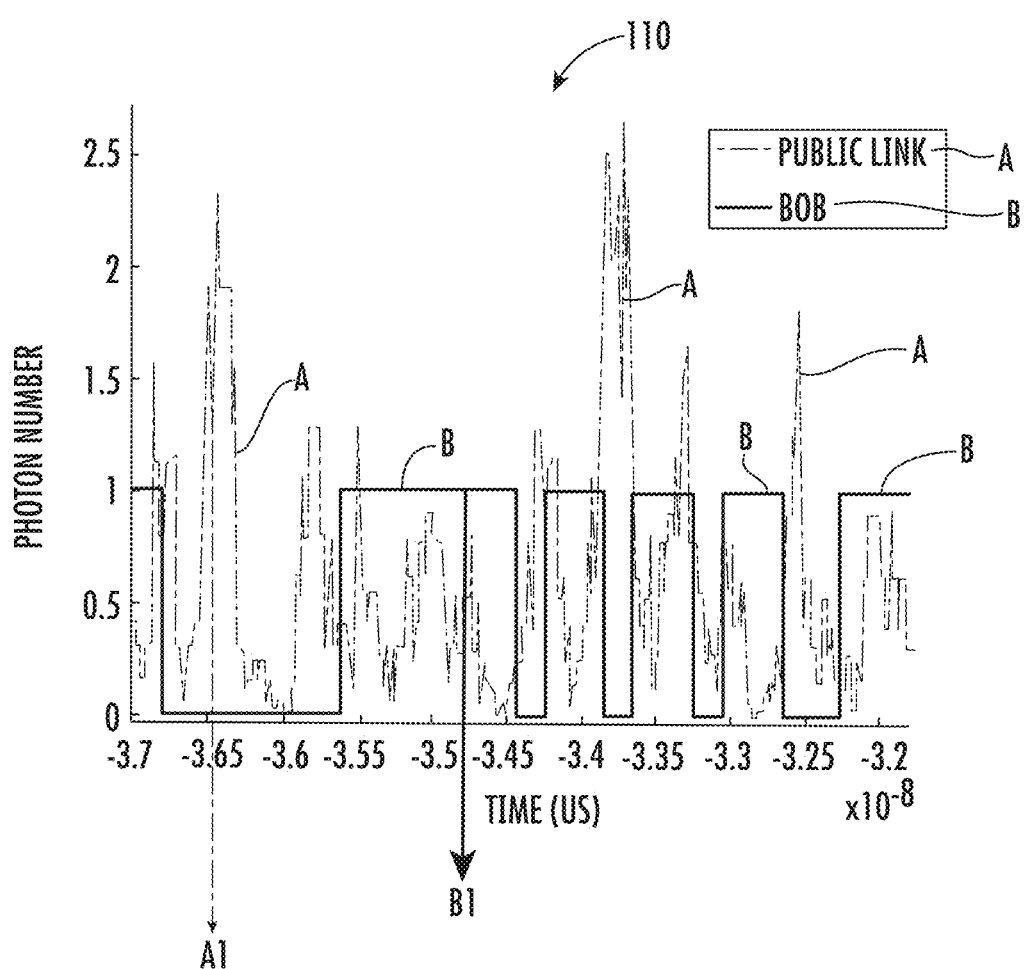
FIG. 4 is a graph showing the improvement to prevent tampering using the quantum communications system of FIG. 1.

Referring now to FIG. 4, there is illustrated at 110 a graph showing the improvements resulting from the quantum communications system 20 to resist any tampering such as by Eve, when the pulse divider 42 and pulse recombiner 54 are employed. As illustrated as point A1 on the graph, Eve's measurements are reduced to random and Eve's ability to recreate the state is impossible without a matched receiver. As shown at point B1 on the graph, Alice and Bob may receive the same bits after sifting.

As shown in the chart of FIG. 5, the improvements for increased sensitivity to tampering such as by Eve indicates that the use of the pulse divider 42 and pulse recombiner 54 may potentially tolerate up to four times more bit errors than other protocols, from sources such as channel degradation, and still be operable. The state-of-the-art for a conventional quantum system without use of pulse dividers 42 and pulse recombiners 54 is shown in the first column and the use of the pulse combiner and pulse recombiner as a divided pulse QKD in an example with four stages, and assuming Eve does not have a matched receiver, is shown in the second column. The QBER without Eve is shown in the first row, and the QBER with Eve is shown in the second row, and the relative throughput indicated.

Figure 6:
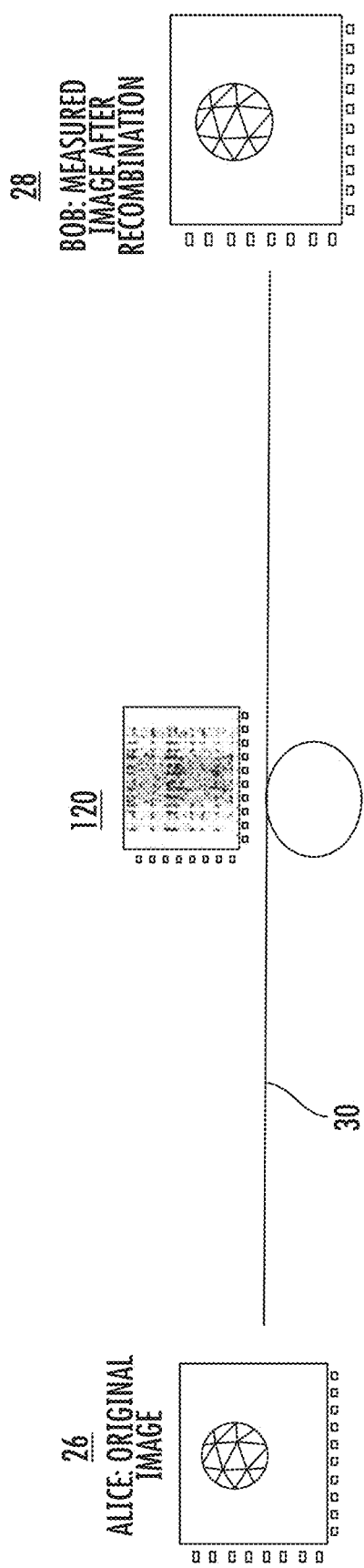
FIG. 6 is a schematic diagram illustrating the inaccuracy of a measured image in the public link of the quantum communications channel using the quantum communications system of FIG. 1.

Referring now to FIG. 6, there is illustrated a schematic diagram showing inaccuracy of a measured image as in the public link of the quantum communications channel 30 using the quantum communication system 20 of FIG. 1. For example, the original image is shown at the transmitter node 26 (Alice) and is shown relative to the measured image 120 in the public link when the pulse divider 42 and pulse recombiner 54 are employed. The image is shown after recombination at the receiver node 28 and corresponding to the image at the transmitter node 26. The measured image 120 in the public link cannot be discerned even if Eve somehow correctly chose the frequency of the data. The optical communication system 20 as described provides high security, tamper evident communications, and low probability of interception/detection that are compatible with optical fiber, free space and underwater links and achieved with, for example, pulse division techniques using the pulse divider 42 and pulse recombiner 54.

Figure 7:
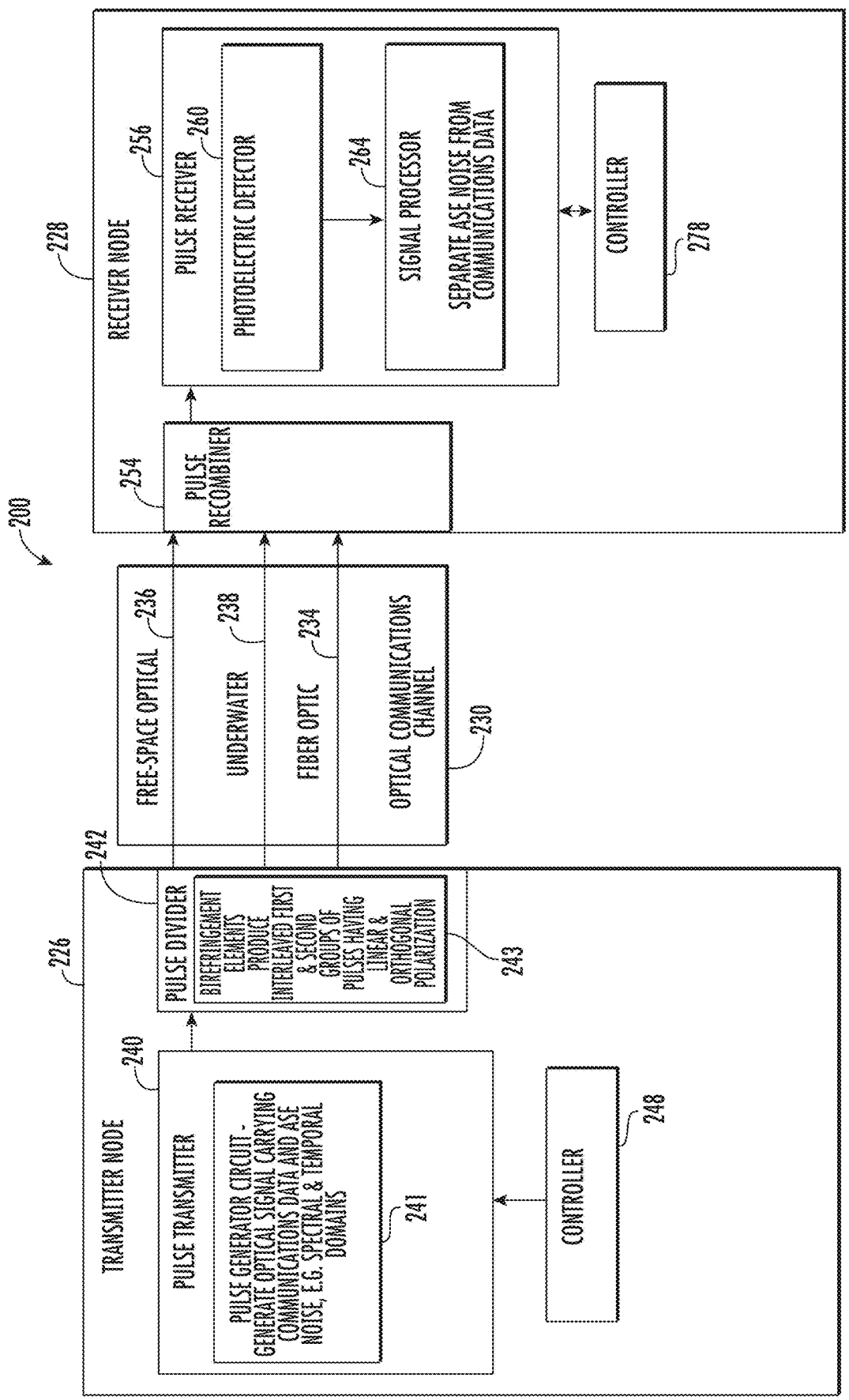
FIG. 7 is a block diagram of a communications system using a pulse divider and pulse recombiner and incorporating an optical communications channel.

Referring now to FIG. 7, there is illustrated at 200 a communications system that is not a quantum communication system that includes a transmitter node 226, receiver node 228, and an optical communications channel 230 coupling the transmitter node and the receiver node. The transmitter node 226 includes a pulse transmitter 240 and a pulse divider 242 downstream therefrom and the receiver node 238 includes the pulse recombiner 254 and pulse receiver 256 downstream therefrom. The optical communications channel 230 may be a free-space optical communications channel 236, an underwater communications channel 238, or fiber optic communications channel 234, such as a single mode fiber or a multi-mode fiber.

The pulse transmitter 240 may include pulse generation circuitry 241 that is configured to generate an optical signal carrying communications data and amplified simultaneous emission (ASE) noise, which may be in the spectral and temporal domains. the pulse divider 242 may include birefringent elements 243, that divide the pulses received from the pulse transmitter 240 into a first group of pulses having a first polarization and a second group of pulses having a second orthogonal polarization. These first and seconds of pulses may be interleaved with each other. The pulse receiver 256 may include a photoelectric detector 260 and a signal processor 264 coupled to the photoelectric detector and configured to separate the amplified spontaneous emission (ASE) noise from the communications data. The transmitter node 226 may include a controller 248 connected to the pulse transmitter 240 and controlling operation of the pulse transmitter. The receiver node 228 may include a controller 278 connected to the pulse receiver 256 and controlling operation of the pulse receiver, including the signal processor 264.

The data signal from the pulse transmitter 240 is passed through the pulse divider 242, which may create copies of each bit and distribute them into neighboring time bins, foiling attempts to extract information about the data. As the power in the data signal is reduced and the pulse copies are increased, security of the data increases. The broad probability distribution function of the data created by the pulse divider 242 may be compatible with frequency hopping techniques and classical encryption techniques and may provide an integrated and added layer of physical security.

Different pulse dividers 242 and pulse recombiners 254 may be used for both the quantum communications system 20 of FIG. 1 and the communications system 200 shown as a non-quantum optical communication system in FIG. 7. The description relative to components described in FIG. 7 may also apply to the pulse divider 42 and pulse recombiner 54 in FIG. 1.

The pulse divider 242 may receive an input pulse of a first energy level and divide the pulse into a sequence of temporally spaced lower-energy pulses. The pulse recombiner 254 may combine the temporally spaced pulses for input into the pulse receiver 256. The pulse divider 242 may be formed from a sequence of M birefringent elements 243, which divide an initial pulse into a sequence of $2^M$ pulses. This sequence of pulses may include a first group of pulses that have a first polarization, and a second group of pulses that have a second orthogonal polarization. It is possible that the pulses in the first and second groups are interleaved with one another, so that the sequence of pulses have alternating linear polarizations.

The birefringent elements 243 may be formed from a sequence of birefringent crystals 1, 2, . . . , N. Crystals at odd-numbered positions in the sequence may have their optic axes oriented at a 45-degree angle to a direction of linear polarization of the pulse, while crystals at the even-numbered positions may be oriented in the same direction as the linear polarization of the pulse, so that at each crystal, a pulse is split into two equal-intensity pulses, one as an ordinary (o) wave pulse and a second as an extraordinary (e) wave pulse. The o and e pulses are separated in time by $\Delta t = |1/v_e - 1/v_o|L$, where $v_o$ and $v_e$ are the group velocities of the o- and e-waves and L is the crystal length. The length of the shortest crystal in the sequence of crystals may be chosen so that $\Delta t$ exceeds the pulse duration. The length of the $m^{th}$ crystal in the sequence may be $L_m = 2^{m-1} L_1$ to produce equally spaced pulses.

The pulse recombiner 254 may be formed from a second sequence of birefringent crystals, which may be formed from Yttrium vanadate. Any alternating pulses with orthogonal polarizations may be separated with a polarizing beam splitter, and counter-propagate through a gain medium that requires a specific direction of linear polarization. A wave plate may exchange the direction of polarization of the counter-propagating beams, ensuring the correct polarizations for the beam entering the gain medium, and reverse the pulse replicas before the replicas are recombined into a final output pulse.

A mirror may be employed at the pulse recombiner 254 to rotate the polarization of the divided pulses by 90 degrees before they are fully recombined so that all pulses experience the same total delay and recombine into the output pulse. The pulse divider 242 and the pulse recombiner 254 may be implemented by a single stack of birefringent crystals 243. For pulse division, a pulse may be passed in a first direction through a stack of crystals and for pulse recombination, a sequence of pulses may be passed in a second, opposite direction through a stack of birefringent crystals.

Examples and descriptions of different pulse dividers 42 and pulse recombiners 54 that may be used with the quantum communications system 20 of FIG. 1, and pulse dividers 242 and pulse recombiners 253 that may be used with optical communications system 20 of FIG. 7 are disclosed in U.S. Pat. Nos. 8,456,736; 10,109,976; and 10,374,376; and in the articles: Zhou et al., "Divided-Pulse Amplification of Ultrashort Pulses," *Optics Letters*, 32(7), 2007, pp. 871-873; Zhang et al., "Divided Pulse Soliton Self-Frequency Shift: A Multi-Color, Dual-Polarization, Power-Scalable, Broadly Tunable Optical Source," *Optics Letters*, 42(3), 2017, pp. 502-505; and Lamb et al., "Divided-Pulse Lasers," *Optics Letters*, 39(9), 2014, pp. 2775-2777, all of the disclosures which are hereby incorporated by reference in their entirety.

Figure 8:
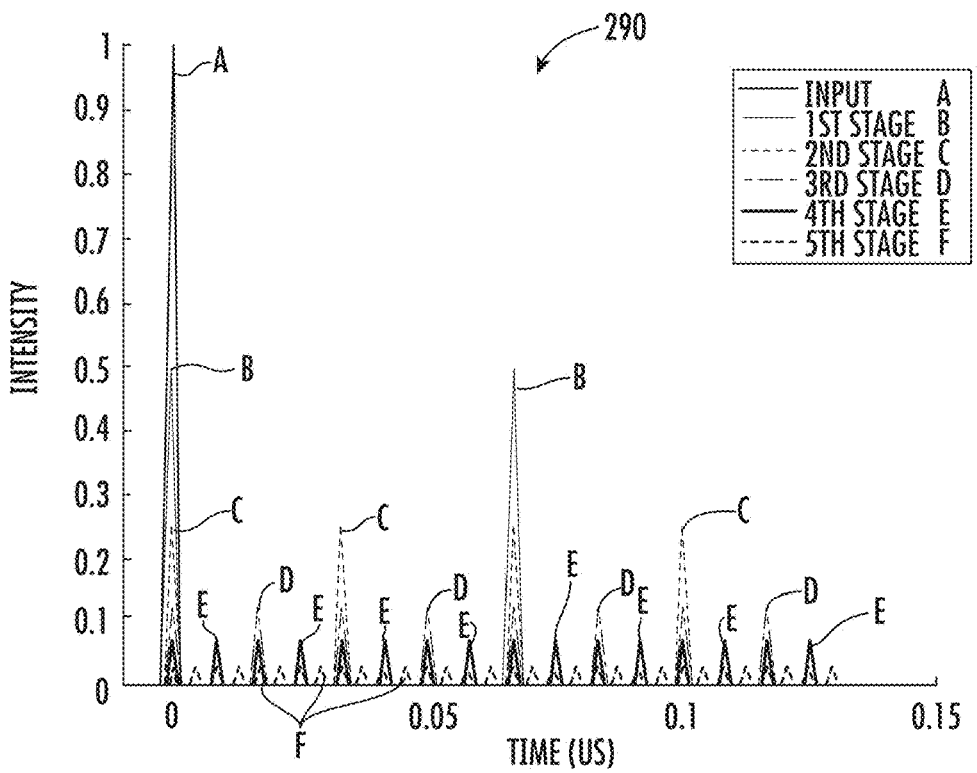
FIG. 8 is a graph showing a simulation of the results in the pulse divider at the transmitter node of the communications system of FIG. 7.
Figure 9:
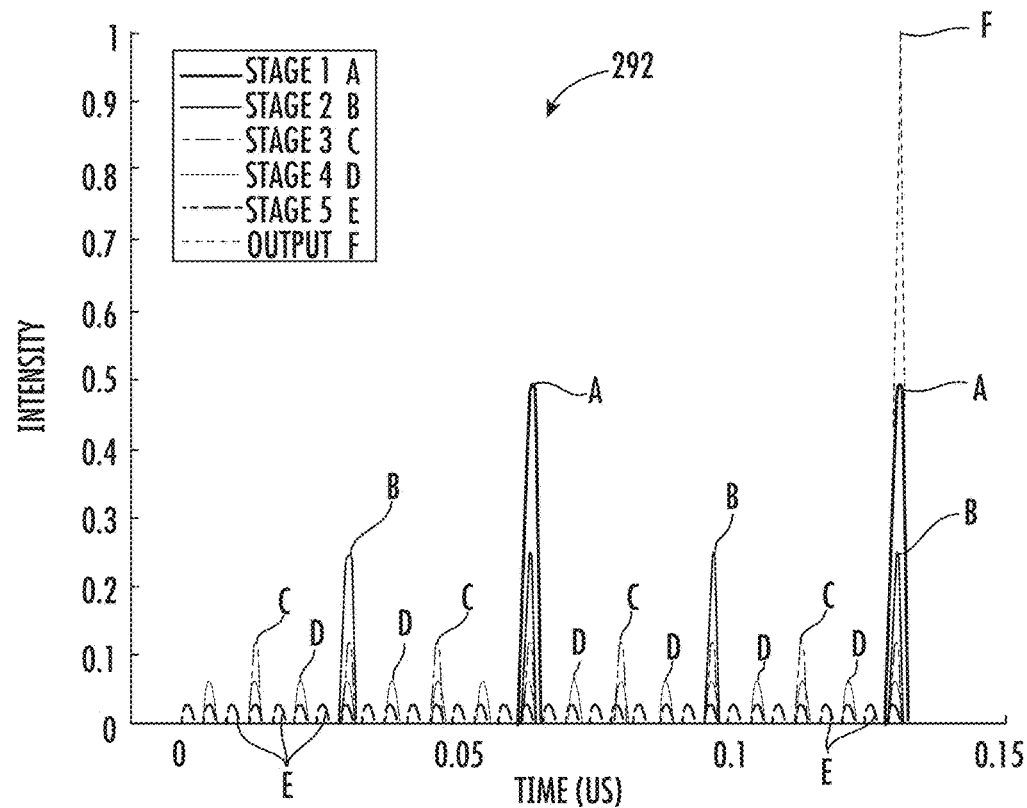
FIG. 9 is a graph showing a simulation of the results of the pulse recombiner at the receiver node of the communications system of FIG. 7.

Referring now to FIG. 8, there is illustrated a graph at 290 showing a simulation of the results in pulse division at the transmitter node 226 using the conventional optical communication system 20 of FIG. 7. The pulse division is shown in the graph of FIG. 8, and the recombining is shown in the graph of FIG. 9 at 292. The different stages in both graphs 290,292 are illustrated as letters A-F.

Figure 10:
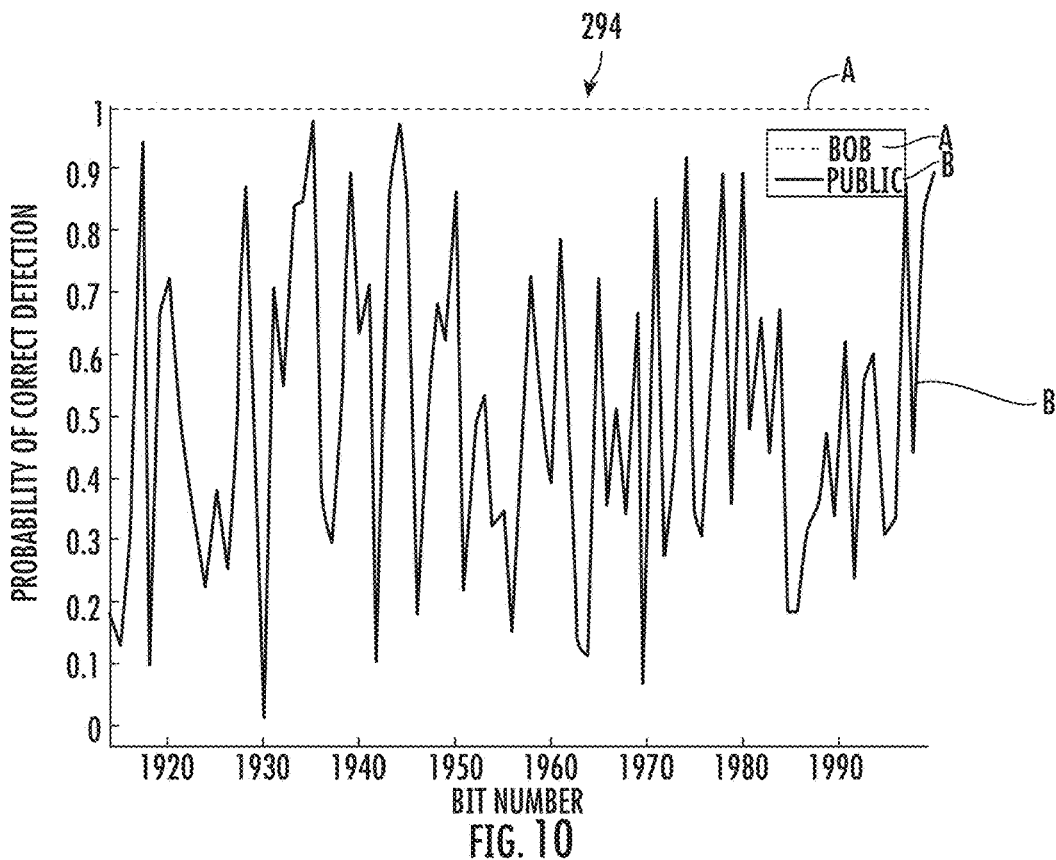
FIG. 10 is a graph showing the probability of detecting a data stream at different locations in the optical communications channel of the communications system of FIG. 7.
Figure 11:
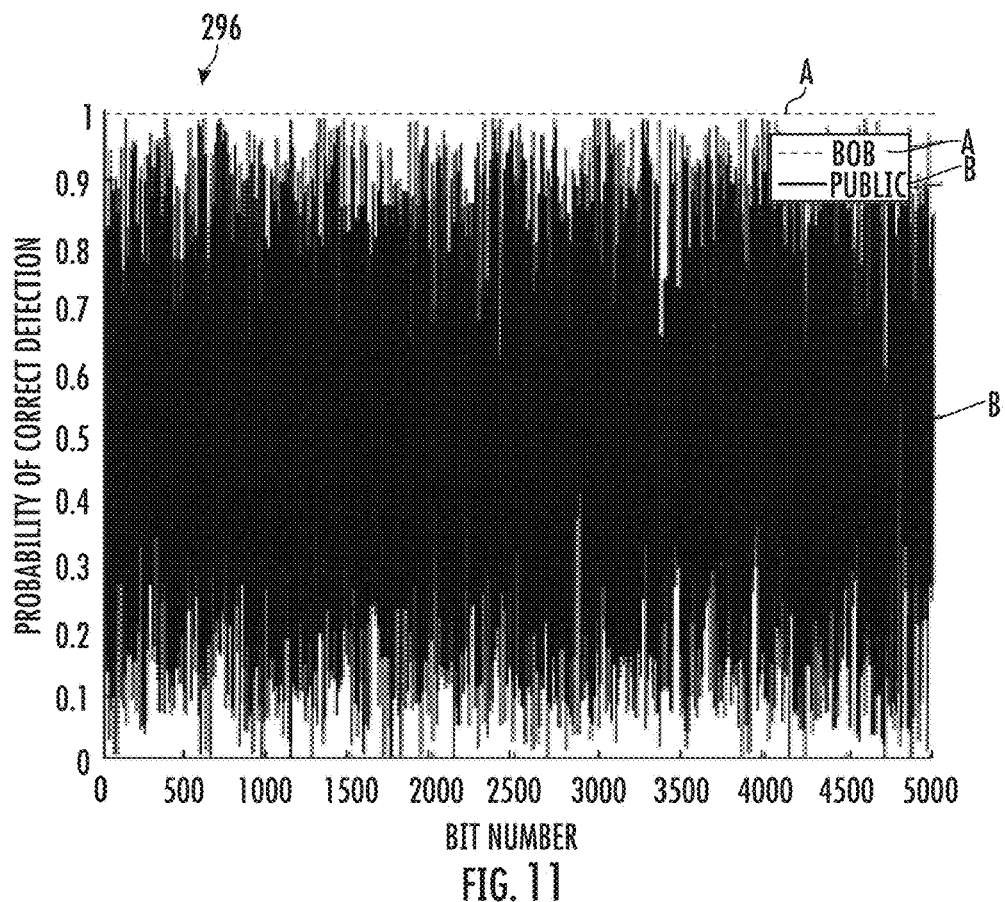
FIG. 11 is a graph showing the probability of detecting a data stream at different locations in the optical communications channel of the optical communications system of FIG. 7.

Referring now to the graphs of FIGS. 10 and 11, shown respectively at 294 and 296, there are illustrated the probabilities of currently detecting an original data stream at different locations in the optical communications channel 230 using the communications system 200 of FIG. 7. Bob and the Public link graph lines are shown as "A" and "B" respectively.

The communications system 200 having the optical communications channel 230 and employment of the pulse dividers 242 and pulse recombiners 254 provides a low probability of detection where weak pulses are hid in tailored noise and makes the probability of detection low. There is a low probability of intercept because each bit is divided into many copies and distributing each copy into bins provides a system 200 where no useful information about the original message is gained. The system 200 is tamper evident because attempts to measure the data mid-link may be detected by the intended recipient and it is compatible with existing methods of data encryption with added potential for protecting against the attacks. Simulations have been based on "OOK" at 10 Gb/s to send an image from the transmitter node 226 to the receiver node 228 with a five-stage version of the divided pulse communications link. Similar performance may be expected as in a demonstrated free-space optical communications channel 236 that is greater than 25 km and greater than 1 Gb/s for communications between ship-shore and underwater up to 100 Mb/S and 100 meter range. A single system may enable communications over multiple link types with different wavelengths and distances. Use of the pulse divider 242 and pulse recombiner 254 are compatible with existing methods of data encryption and compatible with active link monitoring techniques and phase front shaping for increasing link performance and scattering media.

Figure 12:
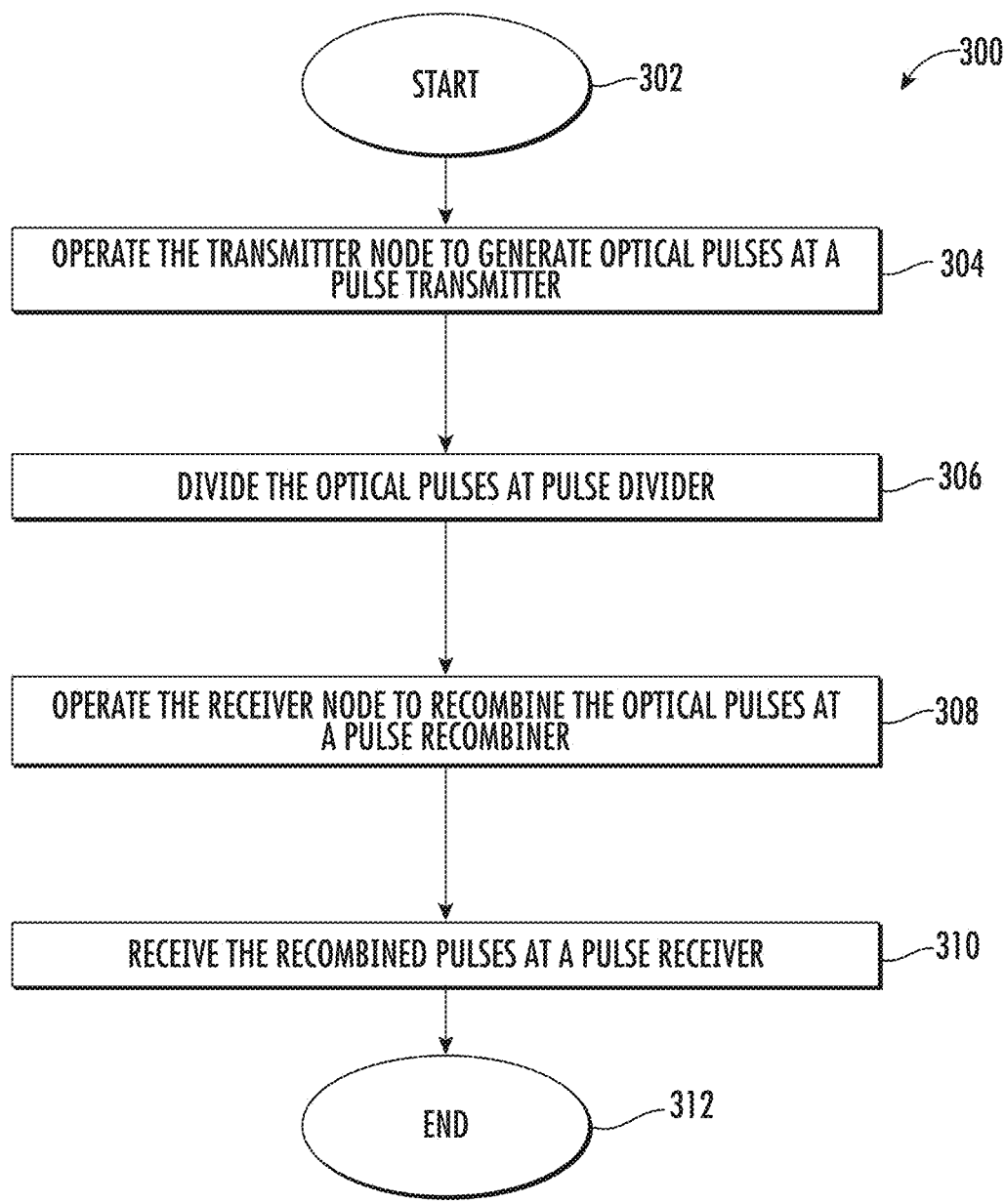
FIG. 12 is a flowchart showing a method of operating the communications system of FIG. 7.

Referring now to FIG. 12, there is illustrated a flowchart generally at 300 that shows the method of operating the communications system 200 shown in FIG. 7. The process starts (Block 302). The transmitter node 226 is operated to generate optical pulses at the pulse transmitter 240 (Block 304). The optical pulses are divided at the pulse divider 242 (Block 306). The receiver node 228 is operated to recombine the optical pulses at the pulse recombiner 254 (Block 308). The recombined pulses are received at the pulse receiver 256 (Block 310). The process ends (Block 312).

This application is related to copending patent application entitled, "QUANTUM COMMUNICATIONS SYSTEM USING PULSE DIVIDER AND ASSOCIATED METHODS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a transmitter node, a receiver node, and an optical communications channel coupling the transmitter node and the receiver node;
the transmitter node comprising a pulse transmitter configured to generate a plurality of optical pulses as a modulated optical communications signal carrying communications data, said pulse transmitter further configured to generate amplified spontaneous emission (ASE) noise having no communications data and transmitted as noise over the plurality of optical pulses as a modulated optical communications signal, and a pulse divider downstream therefrom, said pulse divider comprising M birefringent elements that divide each optical pulse into a sequence of $2^M$ lower energy optical pulses as a first group of lower energy optical pulses that have a first polarization, and second group of lower energy optical pulses that have a second orthogonal polarization with the sequence of $2^M$ lower energy optical pulses as first and second groups interleaved with one another such that the sequence of lower energy optical pulses have alternating linear polarizations and carry the communications data that is hid within the ASE noise; and
the receiver node comprising a pulse recombiner and a pulse receiver downstream therefrom, the pulse receiver comprising a photoelectric detector and a signal processor coupled to the photoelectric detector and configured to separate the ASE noise from the communications data.

2. The communications system of claim 1 wherein the optical communications channel comprises a fiber optic communications channel.

3. The communications system of claim 1 wherein the optical communications channel comprises a free-space optical communications channel.

4. The communications system of claim 1 wherein the optical communications channel comprises an underwater communications channel.

5. The communications system of claim 1 wherein the ASE noise is in spectral and temporal domains.

6. A communications system comprising:
a transmitter node, a receiver node, and an optical communications channel coupling the transmitter node and the receiver node;
the transmitter node comprising a pulse transmitter configured to generate a plurality of optical pulses as a modulated optical communications signal carrying communications data, and said pulse transmitter further configured to generate amplified spontaneous emission (ASE) noise having no communications data and transmitted within the spectral and temporal domains as noise over the plurality of optical pulses as a modulated optical communications channel, and a pulse divider downstream therefrom, said pulse divider comprising M birefringent elements that divide each optical pulse into a sequence of $2^M$ lower energy optical pulses as a first group of lower energy optical pulses that have a first polarization, and second group of lower energy optical pulses that have a second orthogonal polarization with the sequence of $2^M$ lower energy optical pulses as first and second groups interleaved with one another such that the sequence of lower energy optical pulses have alternating linear polarizations and carry the communications data that is hid within the ASE noise; and
the receiver node comprising a pulse recombiner and a photoelectric detector and a signal processor coupled to the photoelectric detector and configured to separate the ASE noise from the communications data.

7. The communications system of claim 6 wherein the optical communications channel comprises a fiber optic communications channel.

8. The communications system of claim 6 wherein the optical communications channel comprises a free-space optical communications channel.

9. The communications system of claim 6 wherein the optical communications channel comprises an underwater communications channel.

10. A method of operating a communications system comprising a transmitter node, a receiver node, and a communications channel coupling the transmitter node and the receiver node, the method comprising:

operating the transmitter node to generate a plurality of optical pulses at a pulse transmitter as a modulated optical communications signal carrying communications data and generate amplified spontaneous emission (ASE) noise having no communications data and transmitted as noise over the plurality of optical pulses as the modulated optical communications signal, and dividing the plurality of optical pulses as the modulated optical communications signal carrying the communications data at a pulse divider, said pulse divider comprising M birefringent elements that divide each optical pulse into a sequence of $2^M$ lower energy optical pulses as a first group of lower energy optical pulses that have a first polarization, and second group of lower energy optical pulses that have a second orthogonal polarization with the sequence of $2^M$ lower energy optical pulses as first and second groups interleaved with one another such that the sequence of lower energy optical pulses have alternating linear polarizations and carry the communications data that is hid within the ASE noise; and operating the receiver node to recombine the optical pulses at a pulse recombiner, and receiving the recombined pulses at a pulse receiver comprising a photoelectric detector and a signal processor coupled to the photoelectric detector and configured to separate the ASE noise from the communications data.

11. The method of claim 10 wherein the optical communications channel comprises a fiber optic communications channel.

12. The method of claim 10 wherein the optical communications channel comprises a free-space optical communications channel.

13. The method of claim 10 wherein the optical communications channel comprises an underwater communications channel.

* * * * *